United States Patent
Osakabe

(10) Patent No.: US 11,808,721 B2
(45) Date of Patent: Nov. 7, 2023

(54) X-RAY ANALYSIS APPARATUS

(71) Applicant: Rigaku Corporation, Akishima (JP)

(72) Inventor: Takeshi Osakabe, Akishima (JP)

(73) Assignee: RIGAKU CORPORATION, Akishima (JP)

( * ) Notice: Subject to any disclaimer, the term of this patent is extended or adjusted under 35 U.S.C. 154(b) by 11 days.

(21) Appl. No.: 17/588,908

(22) Filed: Jan. 31, 2022

(65) Prior Publication Data

US 2022/0244199 A1    Aug. 4, 2022

(30) Foreign Application Priority Data

Jan. 29, 2021   (JP) ................ 2021-013009

(51) Int. Cl.
    *G01N 23/20016*    (2018.01)
    *G01N 23/20025*    (2018.01)

(52) U.S. Cl.
    CPC . *G01N 23/20016* (2013.01); *G01N 23/20025* (2013.01)

(58) Field of Classification Search
    CPC ....... G01N 23/20016; G01N 23/20025; G01N 2223/321; G01N 23/20008; G01N 23/207
    See application file for complete search history.

(56) References Cited

U.S. PATENT DOCUMENTS

| | | | |
|---|---|---|---|
| 3,852,594 A | 12/1974 | Paolini | |
| 5,115,460 A | 5/1992 | De Lange | |
| 2003/0123610 A1* | 7/2003 | Okanda | G01N 23/20 378/71 |
| 2008/0084964 A1* | 4/2008 | Dosho | G01N 23/20 378/81 |
| 2012/0195406 A1* | 8/2012 | Asano | G01N 23/207 378/71 |
| 2015/0098547 A1* | 4/2015 | Wakasaya | G21K 1/00 378/91 |

FOREIGN PATENT DOCUMENTS

| | | | |
|---|---|---|---|
| CN | 106290413 A | * | 1/2017 |
| JP | S5063982 A | | 5/1975 |
| JP | H08262196 A | | 10/1996 |

OTHER PUBLICATIONS

Translation of CN 106290413 A (Year: 2017).*
EPO Extended European Search Report for EP Application No. 22152933.2; dated Jun. 3, 2022.

* cited by examiner

*Primary Examiner* — David P Porta
*Assistant Examiner* — Mamadou Faye
(74) *Attorney, Agent, or Firm* — CANTOR COLBURN LLP

(57) ABSTRACT

Provided is an X-ray analysis apparatus including: a goniometer; a sample stage provided at a rotation center of the goniometer; an X-ray source configured to irradiate a sample with an X-ray, the sample being fixed on the sample stage; an X-ray detector configured to detect the X-ray diffracted by the sample; and an opening/closing mechanism configured to vary a width of a slit, which is formed between a pair of shielding members, by opening/closing the pair of shielding members, the opening/closing mechanism including an asymmetric control unit configured to control aperture widths of the pair of shielding members asymmetrically for one of the pair of shielding members on one side and another one of the pair of shielding members on another side depending on a rotation angle of the goniometer.

9 Claims, 12 Drawing Sheets

Related Art

106

POWER

POWER

X-RAY ANALYSIS APPARATUS

CROSS REFERENCES TO RELATED APPLICATIONS

The present invention claims priority under 35 U.S.C. § 119 to Japanese patent application No. 2021-013009 filed on Jan. 29, 2021, the entire contents of which being incorporated herein by reference.

BACKGROUND OF THE INVENTION

1. Field of the Invention

The present invention relates to an X-ray analysis apparatus.

2. Description of the Related Art

In Japanese Patent Application Laid-open No. S50-63982, there is described an X-ray diffraction apparatus including a rotating device which rotates a specimen at a first angular velocity from a first position to a second position, and a diffraction slit disposed between an X-ray source and the specimen such that X-rays pass through an opening of the diffraction slit, the X-ray diffraction apparatus rotating the slit and the specimen simultaneously, and rotating the diffraction slit at a second angular velocity lower than the first angular velocity so that an irradiated portion of the specimen remains substantially constant during the rotation of the specimen.

In Japanese Patent Application Laid-open No. H08-262196, there is described a slit device, which is capable of regulating an X-ray beam to a specific width and adjusting the regulation width, and includes a pair of slit members, cam follower members integrated with the respective slit members, and a cam which is arranged between the cam follower members and is rotated, the slit members being opened/closed with the rotation of the cam.

SUMMARY OF THE INVENTION

According to at least one aspect of the present invention, there is provided an X-ray analysis apparatus including: a goniometer; a sample stage provided at a rotation center of the goniometer; an X-ray source configured to irradiate a sample with an X-ray, the sample being fixed on the sample stage; an X-ray detector configured to detect the X-ray diffracted by the sample; and an opening/closing mechanism configured to vary a width of a slit, which is formed between a pair of shielding members and allows the X-ray to pass therethrough, by opening/closing the pair of shielding members, the opening/closing mechanism including an asymmetric control unit configured to control aperture widths of the pair of shielding members asymmetrically for one of the pair of shielding members on one side of a straight line connecting one of the X-ray source and the X-ray detector, and the rotation center, and another one of the pair of shielding members on another side of the straight line depending on a rotation angle of the goniometer.

In the X-ray analysis apparatus according to at least one aspect of the present invention, the opening/closing mechanism may further be a divergence slit mechanism configured to limit the X-ray radiated from the X-ray source.

In the X-ray analysis apparatus according to at least one aspect of the present invention, the asymmetric control unit may further include a cam, which is configured to rotate in conjunction with rotation of the goniometer to control the width of the slit, and in which a cam shape for driving the one of the pair of shielding members on the one side and a cam shape for driving the another one of the pair of shielding members on the other side are different from each other.

In the X-ray analysis apparatus according to at least one aspect of the present invention, the cam may further have a cylindrical surface for setting the slit to a certain width when the rotation angle of the goniometer is a rotation angle at which an angle of the X-ray, with which the sample stage is irradiated by the X-ray source, is at and around 0°.

In the X-ray analysis apparatus according to at least one aspect of the present invention, the cam may further have notch surfaces for keeping the width of the slit constant when the goniometer is rotated in a direction in which the angle of the X-ray, with which the sample stage is irradiated by the X-ray source, is negative.

In the X-ray analysis apparatus according to at least one aspect of the present invention, the asymmetric control unit may further include a mechanism for opening/closing the pair of shielding members symmetrically from fully-closed positions thereof depending on the rotation angle of the goniometer, and a mechanism for moving a position of the pair of shielding members as a whole at least in a direction perpendicular to the straight line connecting the one of the X-ray source and the X-ray detector, and the rotation center.

In the X-ray analysis apparatus according to at least one aspect of the present invention, the asymmetric control unit may be further configured to control the width of the slit depending on a rotation angle that is α times the rotation angle of the goniometer for a plurality of a's that are different from one another.

In the X-ray analysis apparatus according to at least one aspect of the present invention, the asymmetric control unit may further include a transmission configured to rotate the cam at a rotation speed depending on a rotation angle that is α times the rotation angle of the goniometer for a plurality of a's that are different from one another.

BRIEF DESCRIPTION OF THE DRAWINGS

FIG. 2A and FIG. 2B are schematic configuration diagrams for illustrating an example of an X-ray analysis apparatus according to at least one embodiment of the present invention, in which FIG. 2A is a block diagram for illustrating a schematic system configuration of the X-ray analysis apparatus, and FIG. 2B shows a schematic configuration of an X-ray diffraction apparatus included in the X-ray analysis apparatus.

FIG. 5A and FIG. 5B are views for illustrating examples of the asymmetric control unit achieved by various cam mechanisms, in which FIG. 5A shows a cam mechanism in which a cam is provided individually for each of a pair of cam followers, and FIG. 5B shows a cam mechanism in which a cam is a cylindrical cam.

FIG. 6A and FIG. 6B are views for illustrating a more detailed design of the asymmetric control unit, in which FIG. 6A is a view for illustrating shapes and a relationship of a cam and cam followers when the divergence slit mechanism is fully closed, and FIG. 6B is a view for illustrating the cam and the cam followers after the cam is rotated.

FIG. 8A and FIG. 8B are views for illustrating a design example of an asymmetric control unit in a modification example of the at least one embodiment, in which FIG. 8A is a top view of the asymmetric control unit, and FIG. 8B is a front view as seen from a direction of the line VIIIB-VIIIB of FIG. 8A.

FIG. 9A and FIG. 9B are views for illustrating design examples of an asymmetric control unit in other modification examples of the at least one embodiment, in which FIG. 9A shows an example in which notch surfaces have planar shapes continuous with a cylindrical surface, and FIG. 9B shows an example in which the notch surfaces have notch shapes.

DETAILED DESCRIPTION OF THE INVENTION

Prior to describing a suitable embodiment of the present invention, a related art to the present invention will be described preliminarily to help understanding the present invention, referring to FIG. 1. The inventor of the present invention has found that, in an X-ray diffraction apparatus, especially when a case in which an X-ray is allowed to enter a sample at a low angle is assumed, by simply controlling a slit width of a divergence slit mechanism so that an irradiation width of the X-ray on the sample matches a width of the sample as in Japanese Patent Application Laid-open Nos. S50-63982 and H08-262196 described above, an unfavorable situation may still occur.

Figure 1:
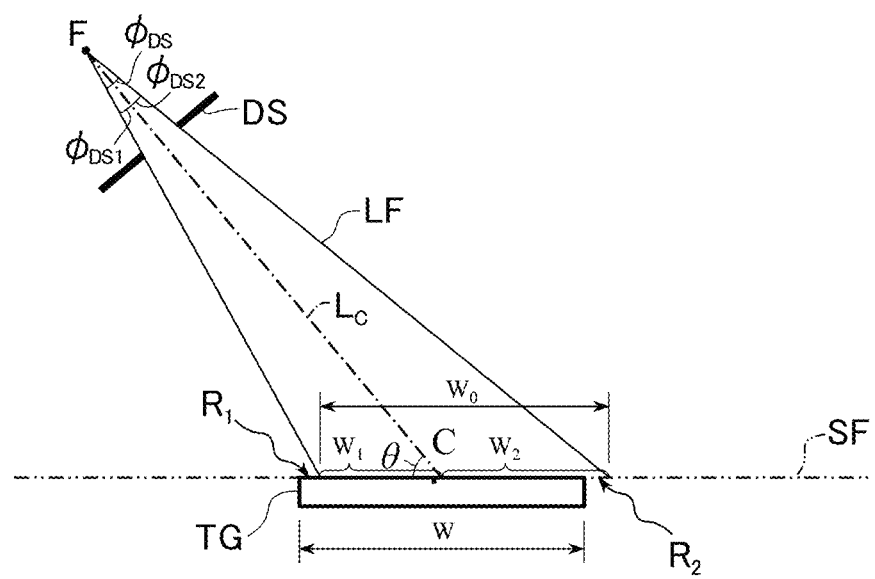
FIG. 1 is a view for illustrating a geometrical relationship in a case in which, in an X-ray diffraction apparatus according to a related art, a slit width of a divergence slit mechanism is simply controlled so that an irradiation width of an X-ray on a sample matches a width of the sample.

FIG. 1 is a view for illustrating a geometrical relationship in a case in which, in an X-ray diffraction apparatus according to the related art, a slit width of a divergence slit mechanism DS is simply controlled so that an irradiation width W0 of an X-ray on a sample TG matches a width W of the sample. FIG. 1 shows a situation in which the sample TG having the width W is irradiated at an angle θ with a light flux LF of the X-ray radiated from an X-ray source F and formed by the divergence slit mechanism DS, the sample TG being fixed on a goniometer head at a location separated by a predetermined distance.

In general, an optical axis LC of the light flux LF is adjusted so as to pass through a geometric center C of the sample TG. Thus, a divergence angle φDS1 of the light flux on a side on which an angle formed by the optical axis LC and a sample surface SF with respect to the center C of the sample TG is an acute angle (in FIG. 1, lower left side of the optical axis LC, hereinafter referred to as "front side of the center C"), and a divergence angle φDS2 of the light flux on a side on which an angle formed by the optical axis LC and the sample surface SF is an obtuse angle (in FIG. 1, upper right side of the optical axis LC, hereinafter referred to as "back side of the center C") are generally equal to each other, and the following equation is established with respect to a divergence angle φDS of the light flux LF per se:

$$\phi_{DS1} = \phi_{DS2} = \frac{1}{2}\phi_{DS}$$

In FIG. 1, the sample surface SF of the sample TG is illustrated as a virtual plane obtained by extending the sample surface SF to the outside of the sample TG, for convenience.

Further, the divergence slit mechanism DS is a mechanism for varying a slit width of an optical slit, and the slit width is adjusted depending on an angle φ so that the irradiation width W0 of the light flux LF on the sample surface SF matches the width W of the sample TG.

At this time, the divergence angle φDS is in general sufficiently small (for example, from about 0.5° to about 3°). Thus, when the angle θ is large, it can be regarded that an irradiation width W1 on the front side of the center C and an irradiation width W2 on the back side of the center C are substantially equal to each other, and no particular problem occurs.

However, when the angle θ is small (for example, 10° or less), as illustrated in FIG. 1, the irradiation width W1 becomes smaller than the irradiation width W2 (this situation is drawn in an exaggerated manner in FIG. 1). As a result, even when the divergence slit mechanism DS is controlled so that the irradiation width W0 of the light flux LF on the sample surface SF is equal to the width W of the sample TG, a region R1 in which the sample TG is not irradiated with the light flux LF occurs on the front side of the center C, and a region R2 irradiated with the light flux LF occurs outside the sample TG on the back side of the center C.

To address the above-mentioned problems, when the slit width of the divergence slit mechanism DS is increased to increase the divergence angle φDS so that the region R1 does not occur, the region R2 is enlarged to irradiate a member outside the sample TG, for example, a sample stage, with the X-ray, and hence background noise is increased. In contrast, when the slit width of the divergence slit mechanism DS is reduced to reduce the divergence angle φDS so that the region R2 does not occur, the region R1 is enlarged to increase the region in which the sample TG is not irradiated with the light flux LF of the X-ray, and hence a diffracted X-ray intensity to be detected is reduced. In any case, by simply controlling the slit width of the divergence slit mechanism DS, the problems of the reduction in diffracted X-ray intensity and the increase in background noise cannot be solved at the same time.

The present invention has been made in view of the above-mentioned circumstances, and therefore has an object, in an X-ray diffraction apparatus, to prevent an increase in background noise while preventing a reduction in diffracted X-ray intensity.

Now, an X-ray analysis apparatus 100 according to at least one embodiment of the present invention will be described with reference to FIG. 2A to FIG. 12B.

Figure 2A:
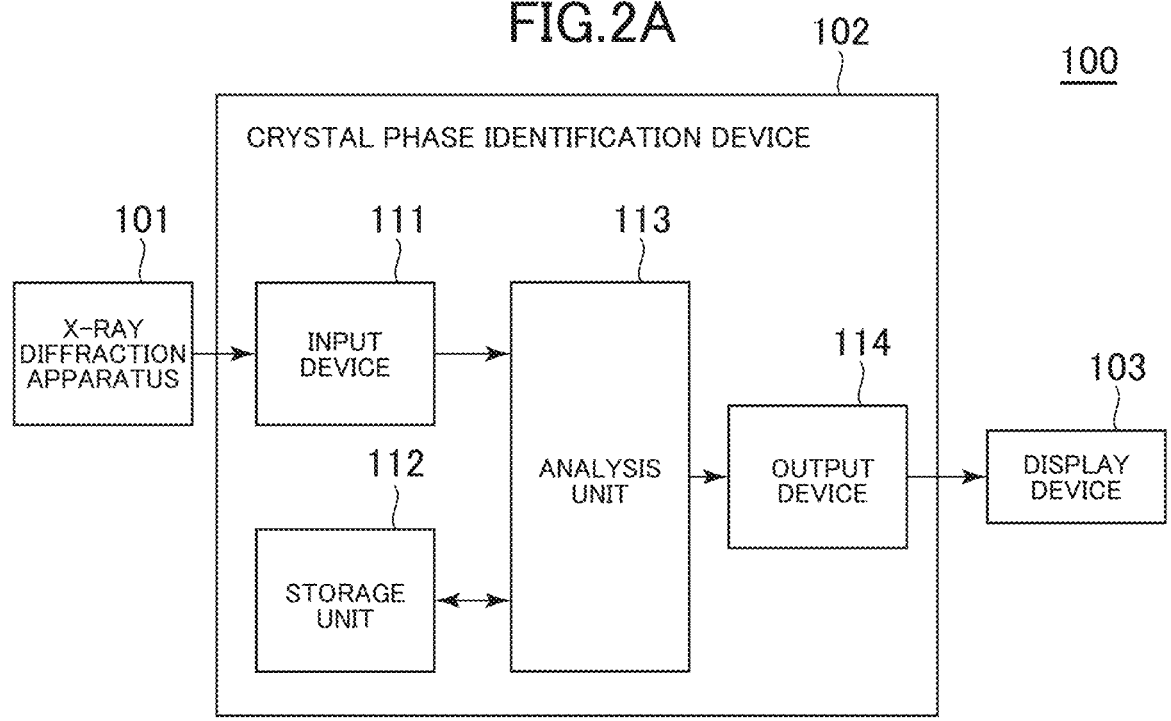
Figure 2B:
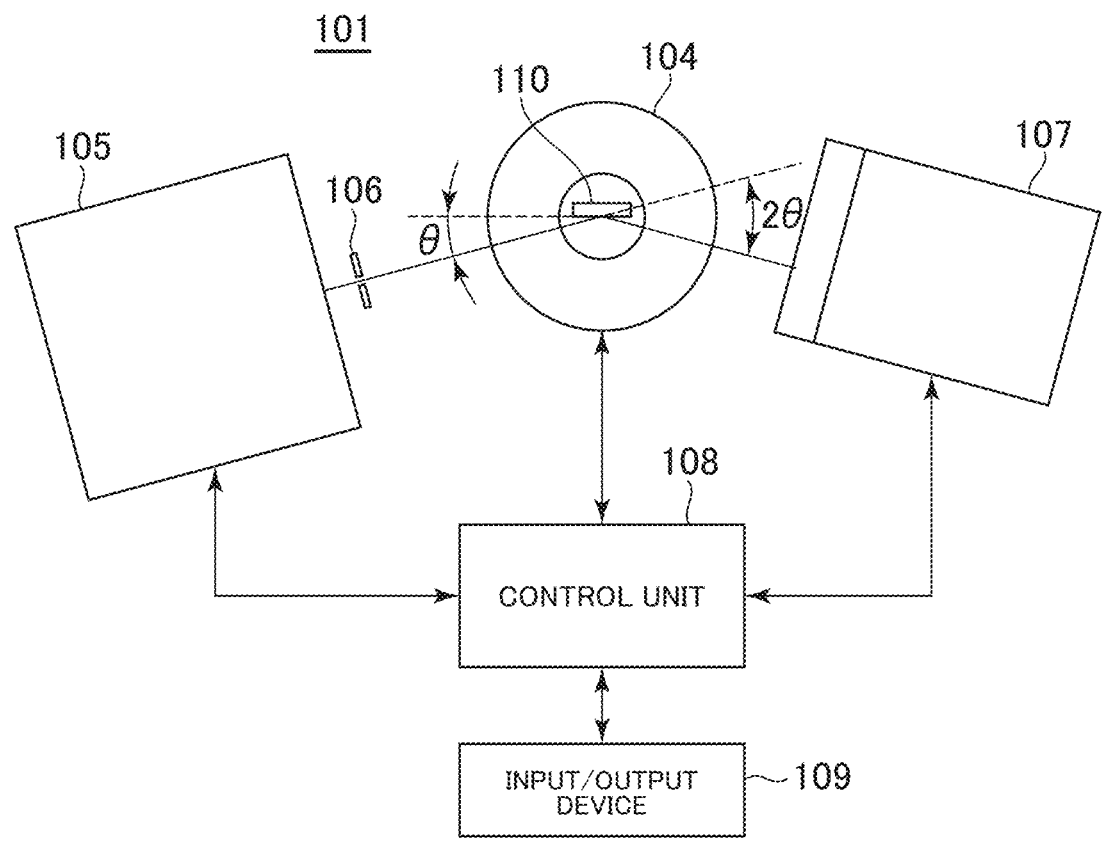

FIG. 2A and FIG. 2B are schematic configuration diagrams for illustrating an example of the X-ray analysis apparatus 100 according to the at least one embodiment of the present invention, in which FIG. 2A is a block diagram for illustrating a schematic system configuration of the X-ray analysis apparatus 100, and FIG. 2B is a diagram for illustrating a schematic configuration of an X-ray diffraction apparatus 101 included in the X-ray analysis apparatus 100.

Referring to FIG. 2A, the X-ray analysis apparatus 100 includes the X-ray diffraction apparatus 101, a crystal phase identification device 102, and a display device 103. The display device 103 is formed of a flat panel display device, for example, and may be integrated with the crystal phase identification device 102.

The crystal phase identification device 102 includes an input device 111, a storage unit 112, an analysis unit 113, and an output device 114. The crystal phase identification device 102 can be achieved by a general computer, and in that case, for example, the input device 111 and the output device 114 are formed of an input/output interface, the storage unit 112 is formed of a hard disk drive and a memory, and the analysis unit 113 is formed of a CPU. The storage unit 112 has stored therein a database. In the database, data of peak positions and peak intensity ratios in 2θ-I profiles of X-ray diffraction patterns of a plurality of known crystal phases is registered as data of an intensity ratio I with respect to a distance "d" of a lattice plane (d-I data). The storage unit 112 may be an external hard disk drive, for example, or some or all functions of the analysis unit 113 and the storage unit 112 may be executed by an external server or other equipment to/from which information can be communicated through the Internet or other telecommunication lines by a so-called cloud computing method. FIG. 2A is the block diagram for illustrating the system configuration, and hence physical positions of equipment performing functions of the X-ray analysis apparatus 100 represented by the respective blocks are not limited.

The analysis unit 113 stores X-ray diffraction data, which is input from the X-ray diffraction apparatus 101 via the input device 111, in the storage unit 112. Then, the analysis unit 113 performs information processing on the X-ray diffraction data stored in the storage unit 112 to store a processing result in the storage unit 112, and also display the processing result on the display device 103 via the output device 114.

Referring to FIG. 2B, the X-ray diffraction apparatus 101 includes a goniometer 104, an X-ray generator 105, a divergence slit mechanism 106, an X-ray detector 107, a control unit 108, and an input/output device 109. The goniometer 104 is an instrument for measurement of an angle, and has provided at a center portion thereof a sample stage (not shown) which is rotated with a sample 110 placed thereon. An X-ray generated from the X-ray generator 105 passes through the divergence slit mechanism 106 to become a light flux having a thin strip shape with its width extending in a direction perpendicular to the sheet surface of FIG. 2B, and the sample 110 is irradiated with the X-ray. The X-ray detector 107 detects the X-ray diffracted by the sample 110. When an angle of the X-ray, with which the sample 110 is irradiated, from a lattice plane of the sample 110 is θ, a diffraction angle is 2θ. The control unit 108 is formed of a computer, a sequencer, or a dedicated circuit, for example, and controls the goniometer 104, the X-ray generator 105, and the X-ray detector 107. The input/output device 109 inputs measurement conditions, for example, to the control unit 108, and outputs the X-ray diffraction data detected by the X-ray detector 107 to the crystal phase identification device 102. Further, the X-ray detector 107 is not limited to a two-dimensional detector, and may have a configuration in which a zero-dimensional detector or a one-dimensional detector is used, and the sample 110 or the X-ray detector 107 is moved or rotated.

Figure 3:
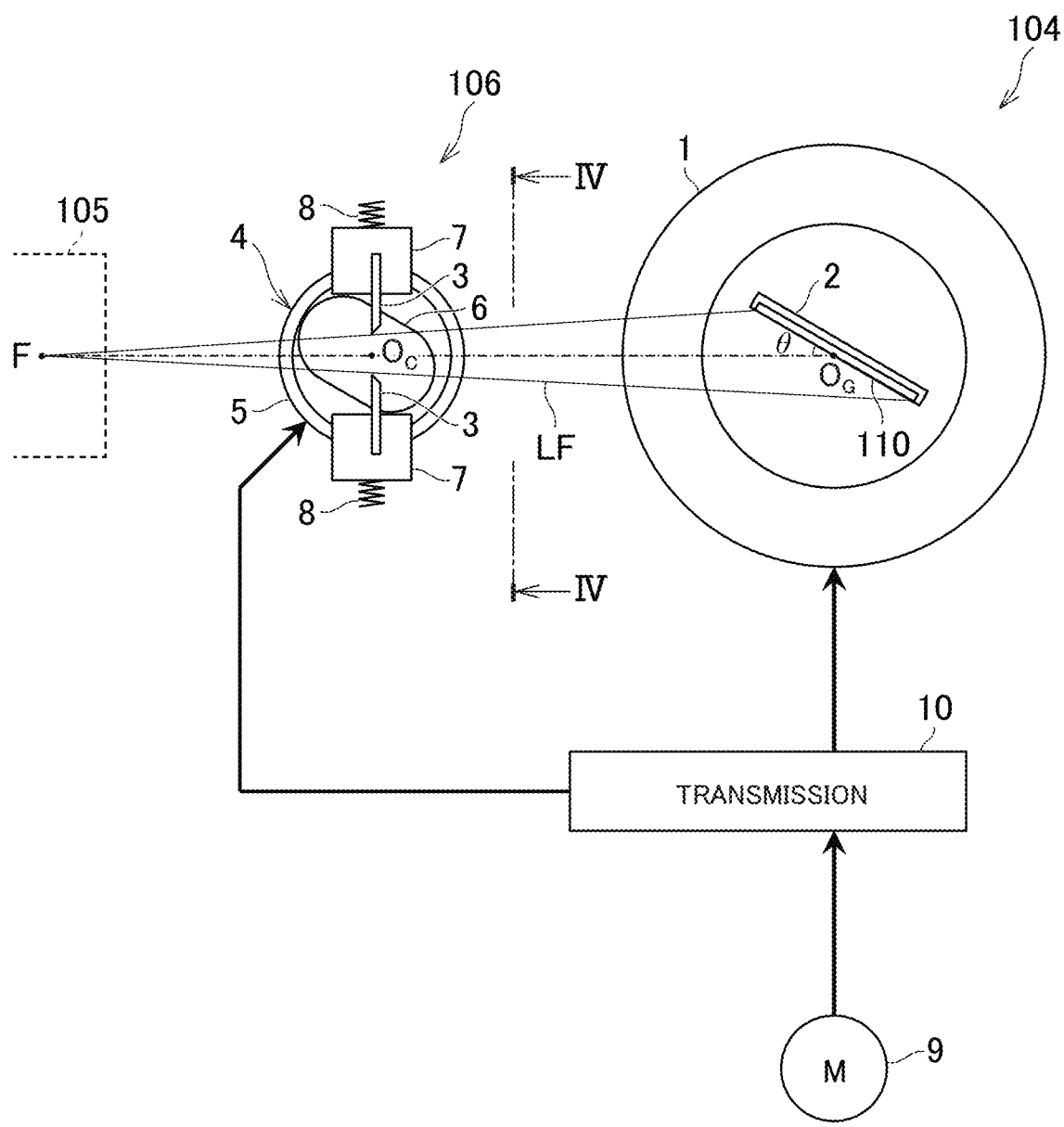
FIG. 3 is a configuration diagram for illustrating main parts of a goniometer, an X-ray generator, and a divergence slit mechanism of the X-ray diffraction apparatus.

FIG. 3 is a configuration diagram for illustrating main parts of the goniometer 104, the X-ray generator 105, and the divergence slit mechanism 106 of the X-ray diffraction apparatus 101. The structure per se of the X-ray generator 105 is only slightly related to the gist of the present invention, and hence illustration of a detailed structure thereof is omitted in FIG. 3, and an X-ray source F located therein is simply illustrated as a point light source of the X-ray. The X-ray source F may be a light source that can be regarded as the point light source as illustrated, or there is no problem in the following description when the X-ray source F is a linear light source having a width in a direction perpendicular to the sheet surface of FIG. 3, and the present invention is not limited thereto. As the X-ray source F, a general X-ray tube may be used, and a material of the tube may be a glass tube, a ceramic tube, or other materials.

The goniometer 104 rotatably holds the sample 110, which is a subject of X-ray analysis, on a sample stage 2 placed on a rotation center of a rotating table 1. In the at least one embodiment, the sample stage 2 is arranged so that, as seen from a direction of a rotation axis of the rotating table 1, a rotation center $O_G$ of the rotating table 1 matches a geometric center C of a sample surface of the sample 110 held on the sample stage 2. Thus, distances from the rotation center $O_G$ to both ends of the sample 110 are equal to each other. FIG. 3 shows relative rotations of the X-ray generator 105 and the divergence slit mechanism 106, and the sample 110 on the sample stage 2, and the configuration in which the rotating table 1 of the goniometer 104 is rotated as described above, and a configuration in which the X-ray generator 105 and the divergence slit mechanism 106 are rotated with respect to the rotating table 1 of the goniometer 104, are both acceptable, and there is no difference therebetween. Accordingly, the rotation center $O_G$ is a center of relative rotation between the goniometer 104, and the X-ray generator 105 and the divergence slit mechanism 106.

The divergence slit mechanism 106 is an opening/closing mechanism which varies a width of a slit formed between a pair of shielding members 3, which are arranged to be opposed to each other, by opening/closing the shielding members. The pair of shielding members 3 have edges with their opposing ends having linear shapes, respectively, and are members made of a metal or other materials having a property of shielding the X-ray. With the shielding members 3 being arranged to be separated with a slight gap, the edges having the linear shapes of the pair of shielding members 3 are opposed to each other over the slight gap, and the slit for allowing the X-ray to pass therethrough is formed therebetween. The X-ray passes through the slit to be limited into the light flux having the thin strip shape, and the shape of the light flux is controlled by varying the width of the slit by the divergence slit mechanism 106, which is the opening/closing mechanism for the pair of shielding members 3. A specific shape of each of the edges having the linear shapes is not particularly limited, but is a so-called knife edge in the at least one embodiment. Further, in the divergence slit mechanism 106 in the at least one embodiment, aperture widths of the shielding members 3 are controlled asymmetrically for the shielding member 3 on one side and the shielding member 3 on the other side of a straight line F-OG connecting the X-ray source F and the rotation center $O_G$ depending on an incident angle of the X-ray.

In this specification, the aperture widths of the shielding members 3 refer to movement distances of the upper and lower shielding members 3 illustrated in FIG. 3, respectively, from a state in which the divergence slit mechanism 106 is fully closed. In the at least one embodiment, edge positions of the shielding members 3 at a time when the divergence slit mechanism 106 is fully closed are on the straight line F-OG connecting the X-ray source F and the rotation center OG, and the shielding members 3 move perpendicularly to the straight line F-OG. Thus, the distances between the edges of the shielding members 3 and the straight line F-OG correspond to apertures of the shielding members 3. The distances between the edges of the shielding members 3 and the straight line F-OG mean distances between intersections of a straight line that is perpendicular to the edges of the shielding members 3 and the straight line F-OG, and the edges and the straight line F-OG, respectively, which match shortest distances between the edges and the straight line F-OG, and are equal to distances between the straight line F-OG and leading edges of the shielding members 3 in the plane illustrated in FIG. 3. Further, the edge positions of the shielding members 3 at the time when the divergence slit mechanism 106 is fully closed may be determined based on virtual positions at which the shielding members 3 would be located if the divergence slit mechanism 106 was fully closed, and it is not necessary required that the divergence slit mechanism 106 be actually fully closed. This is because there are cases in which, as described later, the divergence slit mechanism 106 is not fully closed and is always controlled to leave a slight gap.

Accordingly, the sentence: "the aperture widths of the shielding members 3 are asymmetrical for the shielding member 3 on the one side and the shielding member 3 on the other side of the straight line F-OG" means that the distances between the respective edges of the pair of shielding members 3 and the straight line F-OG are different from each other. In the example illustrated in FIG. 3, the distance between the straight line F-OG and the shielding member 3 on an upper side of FIG. 3, and the distance between the straight line F-OG and the shielding member 3 on a lower side of FIG. 3, are different from each other.

Further, the divergence slit mechanism 106 includes an asymmetric control unit 4 for controlling the aperture widths of the shielding members 3 asymmetrically for the shielding member 3 on the one side and the shielding member 3 on the other side of the straight line F-OG. A specific configuration of the asymmetric control unit 4 is not necessarily required to be limited, and various mechanisms may be used therefor. For example, servo motors, stepping motors, or other electric motors which drive the pair of shielding members 3, respectively, are prepared, and the positions of the shielding members 3 may be controlled independently with use of ball screw mechanisms or worm gear mechanisms, for example. Alternatively, a single drive source such as an electric motor may be provided to control the positions of the shielding members 3 with use of a cam mechanism, a link mechanism, or other appropriate mechanical mechanisms. The former method has an advantage in that the positions of the shielding members 3 can be set freely, and in the latter method, the number of power sources can be reduced, which is advantageous in terms of cost and space.

Here, the width of the slit formed by the divergence slit mechanism 106 is equal to a distance between the edges of the pair of shielding members 3 forming the slit, and hence is equal to a sum of distances by which the respective shielding members 3 have moved from a fully-closed state, that is, the aperture widths of the respective shielding members 3. The width of the slit is hereinafter simply referred to as "slit width."

In the at least one embodiment, description is given of an example in which a cam mechanism is used as the asymmetric control unit 4. The asymmetric control unit 4 includes a rotary shaft 5, a cam 6 fixed to the rotary shaft 5, a pair of cam followers 7 arranged to be opposed to each other and sandwich the cam 6, and elastic members 8, for example, springs which urge the cam followers 7 against the cam 6. Further, FIG. 4 is a front view for illustrating the divergence slit mechanism 106 including the asymmetric control unit 4 as viewed from a direction indicated by the line Iv-Iv of FIG. 3, and FIG. 4 shows a positional relationship of members forming the asymmetric control unit 4 in a depth direction of the sheet surface of FIG. 3.

When the rotary shaft 5 is rotated, the cam 6 is rotated along with the rotation, and the cam followers 7 move following a peripheral shape of the cam 6. The shielding members 3 are fixed to the cam followers 7, and the shielding members 3 move in accordance with the peripheral shape of the cam 6 to change the width of the slit formed by the divergence slit mechanism 106. In FIG. 3, illustration of guides for restricting movements of the cam followers 7 in an up-and-down direction of the sheet surface of FIG. 3 is omitted for the purpose of simple description. Further, although the shielding members 3 are shown to be directly fixed to the cam followers 7, any attaching method may be adopted as long as the shielding members 3 and the cam followers 7 are fixed integrally, and the shielding members 3 and the cam followers 7 may be fixed to each other via other supporting members, for example, appropriate arms. In this example, contact surfaces between the cam followers 7 and the cam 6 are smooth sliding surfaces, and are lubricated appropriately by lubricating oil or grease. Or, the cam followers 7 can be so-called roller followers and are not limited to be sliding followers described above.

Figure 4:
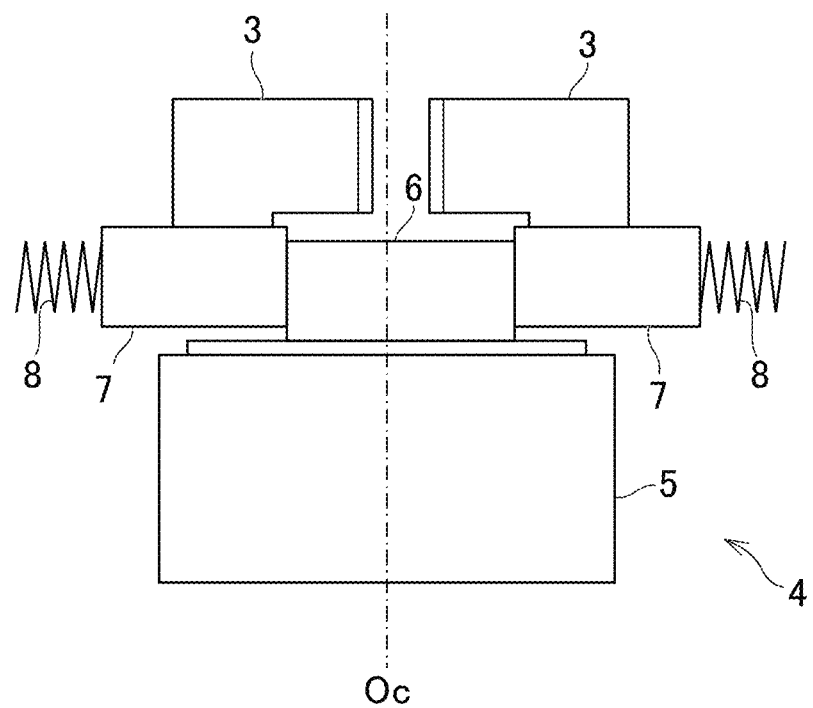
FIG. 4 is a front view for illustrating the divergence slit mechanism including an asymmetric control unit as viewed from a direction of the line IV-IV of FIG. 3.

The asymmetric control unit 4 is arranged in the depth direction of the sheet surface in FIG. 3 and in a lower direction of the sheet surface in FIG. 4 with respect to the shielding members 3 so as not to interfere with a light flux LF of the X-ray, with which the sample 110 is irradiated from the X-ray source F. Then, with the peripheral shape of the cam 6, the shielding member 3 on the one side and the shielding member 3 on the other side are controlled asymmetrically with respect to the straight line F-OG. In other words, in the cam 6 included in the asymmetric control unit 4, a cam shape for driving the shielding member 3 on the one side in the divergence slit mechanism 106 (in this example, shielding member 3 on the upper side of FIG. 3, and on a right side of FIG. 4), and a cam shape for driving the shielding member 3 on the other side (in this example, shielding member 3 on the lower side of FIG. 3, and on the left side of FIG. 4) are different from each other.

Here, in the at least one embodiment, the cam 6 is a plate cam which is rotated about a rotation center OC of the rotary shaft 5, and the pair of cam followers 7 are provided at positions that are 180 degrees symmetrical across the rotation center OC. Thus, the sentence: "the cam shapes for driving the shielding member 3 on a front side and the shielding member 3 on a back side are different from each other" means that, in the case of this example, the peripheral shape of the cam 6, which is the plate cam, is not point symmetrical with respect to the rotation center OC.

The cam mechanism constituted by the cam 6 described in the at least one embodiment is an example of the cam mechanism forming the asymmetric control unit 4. Alternatively, as illustrated in FIG. 5A and FIG. 5B, the asymmetric control unit 4 may be achieved by various cam mechanisms.

Figure 5A:
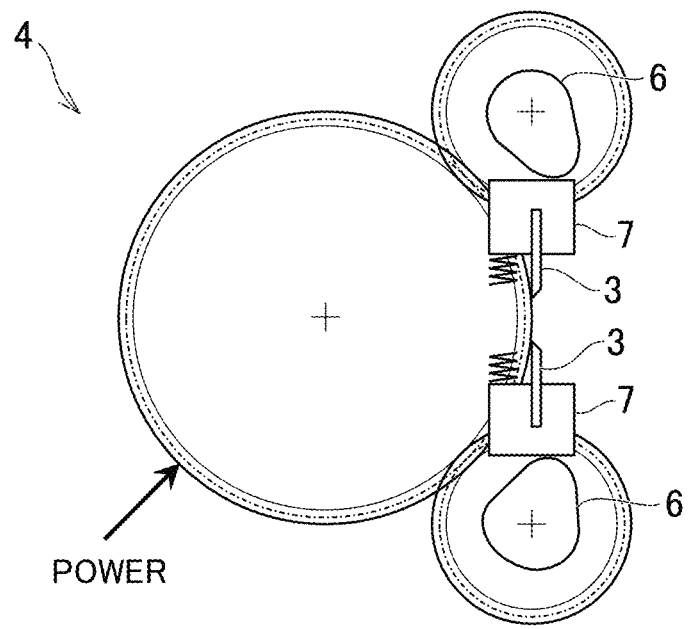

For example, as illustrated in FIG. 5A, a cam 6 may be provided individually for each of a pair of cam followers 7, and the two cams 6 may be rotated in synchronization by an appropriate mechanism. The example of FIG. 5A shows a mechanism in which the two cams 6 are connected to each other by a gear mechanism, and when drive power is supplied to any gear, the cams 6 are rotated in synchronization. Alternatively, a belt mechanism, for example, a timing belt, or a motor shaft may be used.

Figure 5B:
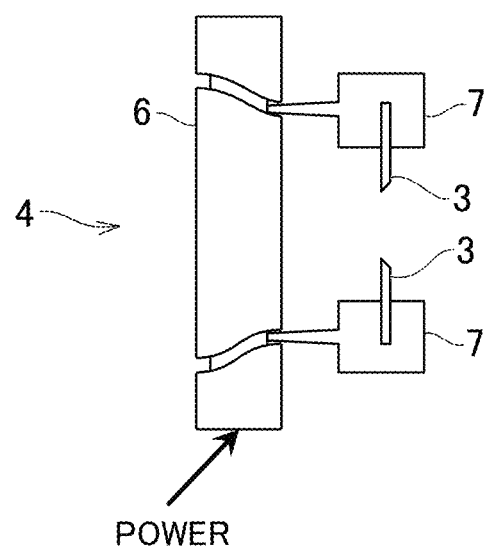

Further alternatively, as illustrated in FIG. 5B, a pair of cam followers 7 may be simultaneously driven by a cam 6 that is a so-called cylindrical cam. When the cam 6 is supplied with power and is rotated about a cylinder axis, positions of the cam followers 7 are controlled in accordance with shapes of grooves cut in a surface of the cam 6. As a matter of course, it is also possible to control the positions of the cam followers 7 with use of a cam 6 in a form other than the examples illustrated in FIG. 3 to FIG. 5B. In any case, with shapes of respective cam surfaces of the cam 6 for driving the pair of cam followers 7 being different from each other, the positions of the shielding member 3 on the one side and the shielding member 3 on the other side can be controlled asymmetrically with respect to the straight line F-OG of the divergence slit mechanism 106.

Returning to FIG. 3, rotational power from an electric motor 9 is transmitted through a transmission 10 to the rotating table 1 of the goniometer 104 and the rotary shaft 5 of the asymmetric control unit 4. The transmission 10 is a speed reducer in this example, and can adjust a rotation angle θ of the rotating table 1 at least in a range of from 0° to 90° by controlling rotation of the electric motor 9. Assuming here that the rotation angle θ of the rotating table 1 is expressed by an angle between the straight line connecting the X-ray source F and the rotation center $O_G$ of the rotating table 1, and the sample surface of the sample 110, when the angle θ is 0°, the sample 110 is irradiated with the X-ray directly from the side in parallel to the sample surface, and when the angle θ is 90°, this corresponds to a case in which the sample 110 is irradiated with the X-ray perpendicularly to the sample surface.

Further, in this example, the rotating table 1 and the rotary shaft 5 are rotated in synchronization at constant speed. In other words, when the rotating table 1 is rotated by the angle θ, the rotary shaft 5 is also rotated by the angle θ. However, a velocity ratio between the rotating table 1 and the rotary shaft 5 may take any value as long as the cam surface shapes of the cam 6 correspond to the rotation angle θ of the rotating table 1.

Still further, although not shown in FIG. 3, the rotational power from the electric motor 9 is also supplied to the X-ray detector 107 illustrated in FIG. 2B to rotate the X-ray detector 107 around the rotation center OG. The X-ray detector 107 is rotated with the rotation center $O_G$ of the rotating table 1 being the center so as to form an angle of 2θ with respect to the X-ray (straight line FOG) with which the sample 110 is irradiated, and hence an angular velocity ratio of the rotational powers supplied to the rotating table 1 and the X-ray detector 107 is 1:2.

It is only required that the rotating table 1 of the goniometer 104, the divergence slit mechanism 106, and the X-ray detector 107 be rotated so that the three keep the above-mentioned geometric positional relationship in a relative manner, and hence, as described in this example, it is not necessarily required that the goniometer 104 be rotated. Alternatively, for example, the goniometer 104 may be fixed, and the divergence slit mechanism 106 may be rotated to form an angle of −θ with respect to the rotation center OG, as long as any two of the X-ray generator 105 and the divergence slit mechanism 106, the sample 110, and the X-ray detector 107 are configured to be rotated.

Figure 6A:
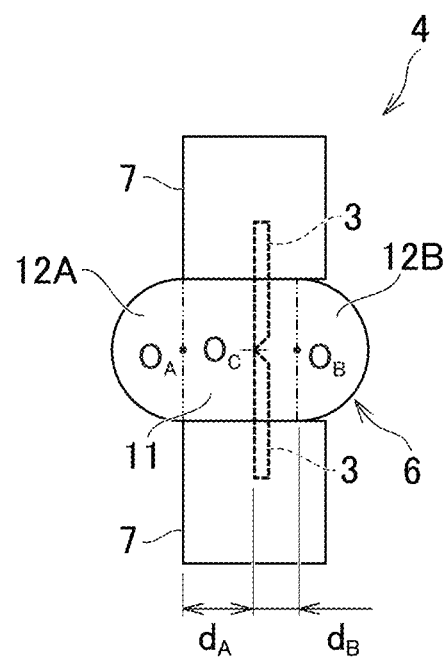
Figure 6B:
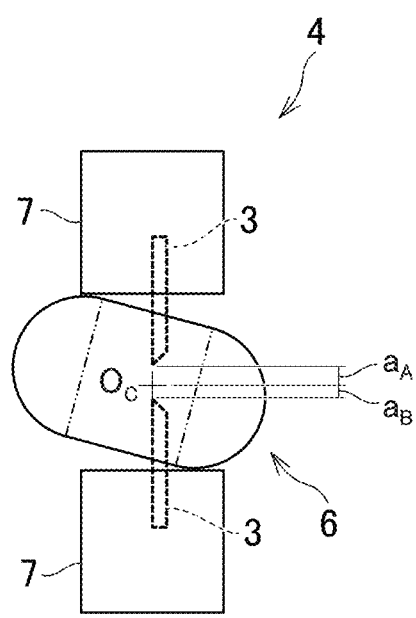

Next, referring to FIG. 6A and FIG. 6B, a more detailed design of the asymmetric control unit 4 described in this example will be described. FIG. 6A is a view for illustrating shapes and a relationship of a cam 6 and cam followers 7 when the angle θ is 0°, that is, when the divergence slit mechanism 106 is fully closed. In FIG. 6A and FIG. 6B, the shielding members 3 are illustrated by the broken lines for reference.

The cam 6 has an elliptical shape with a major axis thereof matching an optical axis of the X-ray (straight line FOG of FIG. 3) when the angle θ=0°, and has a shape obtained by connecting, to the right and left sides of a rectangular portion 11 at the center in FIG. 6A and FIG. 6B, semicircular portions 12A and 12B each having a diameter that is equal to a width of the rectangular portion 11. Further, with respect to a rotation center of the cam 6, that is, the rotation center OC of the rotary shaft 5, a distance dA to a center OA of the semicircular portion 12A, and a distance dB to the center OB of the semicircular portion 12B are different from each other, and "dA>dB" is satisfied.

Accordingly, the cam 6 is asymmetrical with respect to the rotation center OC, and the cam shape for driving the shielding member 3 on the one side of the straight line F-OG, which is located on the left side of the rotation center OC in FIG. 6A and FIG. 6B, and the cam shape for driving the shielding member 3 on the other side, which is located on the right side of the rotation center OC, are different from each other. In this example, dB is designed to be a value that is about 12% smaller than dA (in FIG. 6A and FIG. 6B, this difference is illustrated in an exaggerated manner).

The cam 6 and the cam followers 7 after the cam 6 is rotated are illustrated in FIG. 6B. In this example, FIG. 6B shows a state in which the angle θ is increased, and the cam 6 is rotated so that the cam followers 7 are moved in directions separating from each other. At this time, as is apparent from FIG. 6B, an aperture aA of the shielding member 3 on the one side is larger than an aperture aB of the shielding member 3 on the other side.

Figure 7:
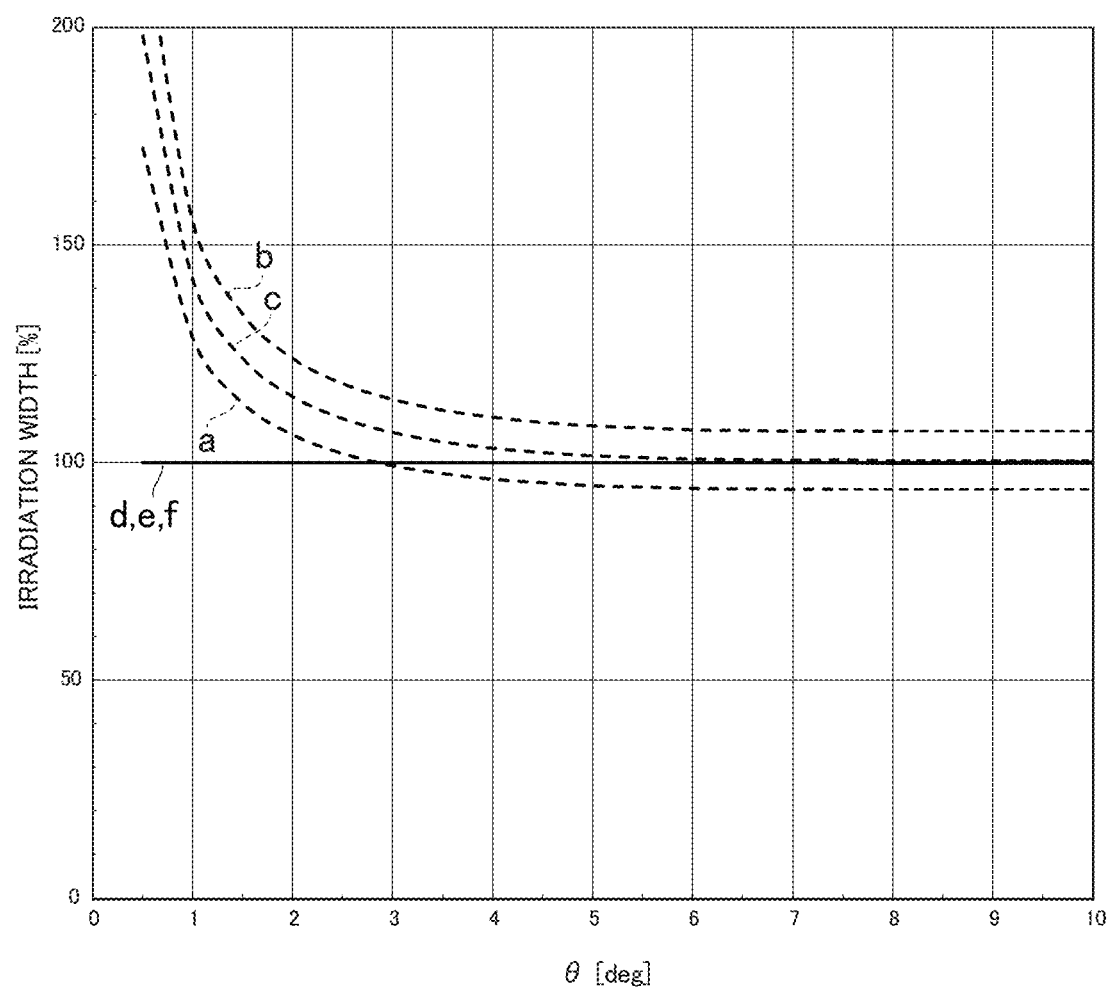
FIG. 7 is a graph for showing changes in irradiation width of the X-ray on a sample surface of the sample with respect to a rotation angle θ in the divergence slit mechanism in the at least one embodiment and the divergence slit mechanism in a comparative example.

With this design, an irradiation width of the X-ray, with which the sample 110 is irradiated from the X-ray source F, on the sample surface is controlled to match the width of the sample 110 with high accuracy. FIG. 7 is a graph for showing changes in irradiation width of the X-ray on the sample surface of the sample 110 when the divergence slit mechanism 106 including the asymmetric control unit 4 in the at least one embodiment is used, and changes in irradiation width of the X-ray on the sample surface of the sample 110 in a comparative example in which the asymmetric control unit 4 is not used, and the apertures of the shielding members 3 of the divergence slit mechanism 106 are equal on a front side and a back side, with respect to the rotation angle θ.

In the graph, the horizontal axis indicates the rotation angle θ in a range of from 0° to 10°, and the vertical axis indicates changes in irradiation width W1 on a front side, irradiation width W2 on a back side, and entire irradiation width W0 of the X-ray, respectively, in percentage with respect to a half and the entirety of a width W of the sample 110. Three curves indicated by the broken lines in the graph are the changes in irradiation width in the comparative example, and although overlapping and appearing to be one curve, three curves indicated by the solid lines are the changes in irradiation width in the at least one embodiment.

The broken line "a" is the change in irradiation width W1 on the front side in the comparative example, the broken line "b" is the change in irradiation width W2 on the back side in the comparative example, and the broken line "c" is the change in entire irradiation width W0 in the comparative example. As is apparent from the graph, when the angle θ falls below 3°, the irradiation width of the X-ray is increased, and a portion other than the sample 110 is also irradiated with the X-ray, and hence it is predicted that background noise is significantly increased. Further, in a range in which the angle θ is generally 5° or more, as indicated by the broken line "c", the irradiation width W0 generally makes a good match with a sample width W. However, as indicated by the broken line "a", the irradiation width W1 on the front side is about 6% shorter than a half of the sample width, that is, W/2, and with the presence of a region that is not irradiated with the X-ray at an end of the sample 110, it can be seen that a reduction in diffracted X-ray intensity occurs. Further, as indicated by the broken line "b", the irradiation width W2 on the back side is about 7% longer than the half of the sample width, that is, W/2, and the sample stage, for example, outside the sample 110 is irradiated with the X-ray, and it can be seen that an increase in background noise occurs.

In contrast, it can be seen that the solid lines "d", "e", and "f" indicating the changes in irradiation width W1 on the front side, irradiation width W2 on the back side, and entire irradiation width W0, respectively, in the at least one embodiment substantially overlap one another, and match the half and the entirety of the width W of the sample 110 accurately over the entire range of from 0° to 10° of the rotation angle θ. A size of deviation from the half and the entirety of the width W of the sample 110 remains 0.2% or less at maximum for the irradiation width W1 on the front side and the irradiation width W2 on the back side, and remains 0.1% or less at maximum for the entire irradiation width W0 so that there is substantially no region in which the sample surface of the sample 110 is not irradiated with the X-ray, and the outside of the sample 110 is substantially not irradiated with the X-ray. Thus, it can be seen that the increase in background noise can be prevented while suppressing the reduction in diffracted X-ray intensity.

Figure 8A:
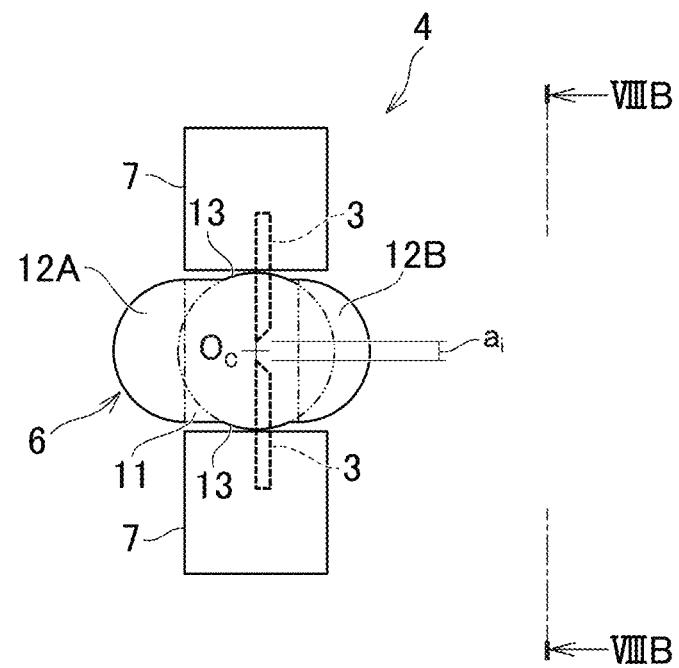
Figure 8B:
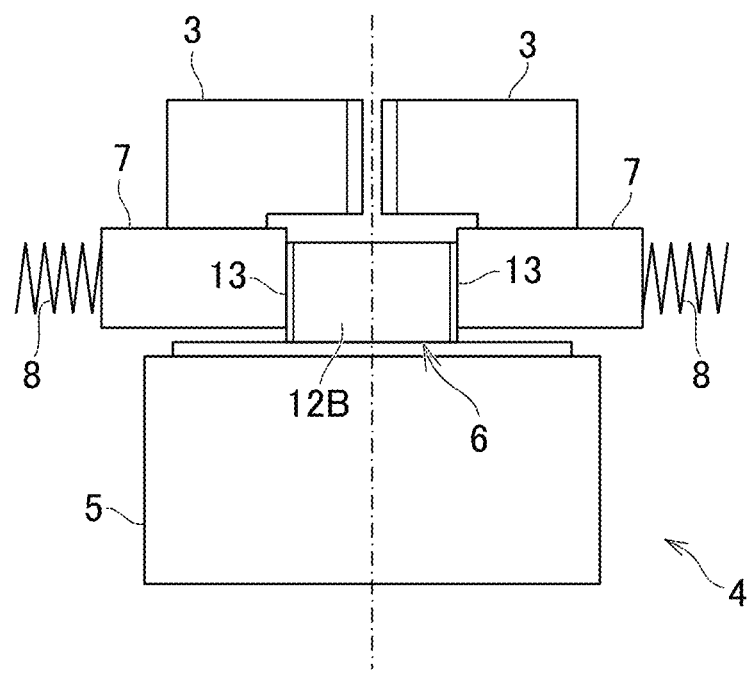

FIG. 8A and FIG. 8B are views for illustrating a design example of an asymmetric control unit 4 in a modification example of the at least one embodiment, in which FIG. 8A is a top view of the asymmetric control unit 4, and FIG. 8B is a front view as seen from a direction indicated by the line VIIIB-VIIIB of FIG. 8A. FIG. 8B also shows the rotary shaft 5 and the elastic members 8, illustration of which is omitted in FIG. 8A. In this modification example, a cam 6 has formed thereon a cylindrical surface 13, which is brought into contact with the contact surfaces of the cam followers 7 when the angle θ is in a range of at and around 0°. A center of the cylindrical surface 13 matches the rotation center OC, and the cylindrical surface 13 has a diameter that is slightly larger than a width of the rectangular portion 11 and the diameters of the semicircular portions 12A and 12B of the cam 6, and slightly protrudes from side surfaces of the rectangular portion 11 (in FIG. 8A, the diameter of the cylindrical surface 13 is drawn in a manner exaggerated over reality). The range of the angle θ in which the cam followers 7 and the cylindrical surface 13 are brought into contact with each other may be suitably determined, but may be from about ±1° to about ±2° as an example.

Thus, when the angle θ is in the range of at and around 0°, the gap between the pair of cam followers 7 is widened by the cylindrical surface 13 to slightly open the shielding members 3 so that the divergence slit mechanism 106 opens with a slit width ai. Further, when the cam 6 is further rotated, the cam followers 7 are brought into contact with the semicircular portions 12A and 12B to open the shielding members 3 in a controlled manner, and hence in this modification example, the divergence slit mechanism 106 is never fully closed.

With the formation of the above-mentioned cylindrical surface 13, when a rotation angle θ of the goniometer 104 is at 0° or around 0°, the X-ray having a constant thin width can be radiated on the sample stage 2, and preparation operations, such as alignment and calibration, of equipment at the time of installation or during maintenance of the X-ray analysis apparatus 100 can be performed smoothly.

Figure 9A:
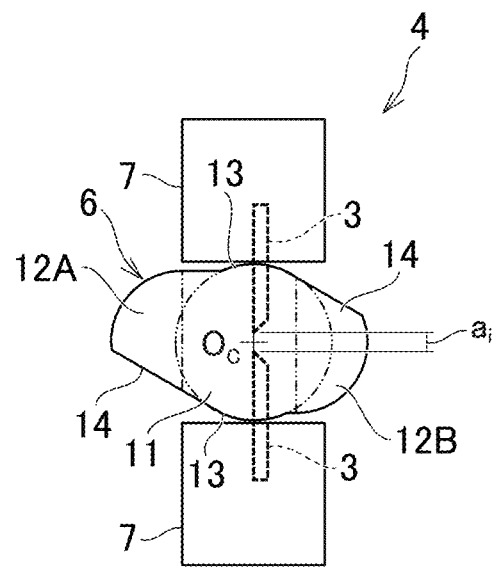
Figure 9B:
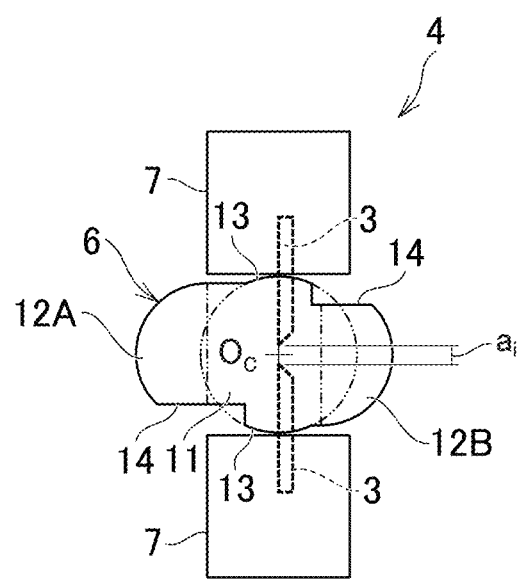

FIG. 9A and FIG. 9B are views for illustrating design examples of an asymmetric control unit 4 in other modification examples of the at least one embodiment. In this modification example, in addition to the above-mentioned modification example, a cam 6 has formed thereon notch surfaces 14 at positions facing cam followers 7 at a rotation angle at which the angle θ is negative, that is, at a rotation angle in a direction in which the cam 6 is rotated anti-clockwise in FIG. 9A and FIG. 9B. The notch surfaces 14 are intended to prevent a situation in which, when the cam 6 is rotated in the negative direction, the rectangular portion 11 and the semicircular portions 12A and 12B are brought into contact with and push open the cam followers 7 to increase the slit width of the divergence slit mechanism 106.

FIG. 9A shows an example in which the notch surfaces 14 have planar shapes continuous with the cylindrical surface 13, and FIG. 9B shows an example in which the notch surfaces 14 have notch shapes. As a matter of course, shapes other than the shapes described here may be adopted as shapes of the notch surfaces 14. With the formation of the notch surfaces 14, the slit width of the divergence slit mechanism 106 is kept constant at ai, which is the slit width at the time when the rotation angle θ is 0°, until the rotation angle θ of the cam 6 is in a predetermined negative range, for example, about −5°.

Reasons why the notch surfaces 14 are formed as described above include that, in a case in which a one-dimensional detector is used as the X-ray detector 107, for example, when the rotating table 1 is rotated at a constant speed in a range in which the rotation angle θ is from 0° to positive, the divergence slit mechanism 106 is prevented from being opened to radiate an unnecessary X-ray in an entrance section until an angular velocity becomes constant, for example.

Figure 10:
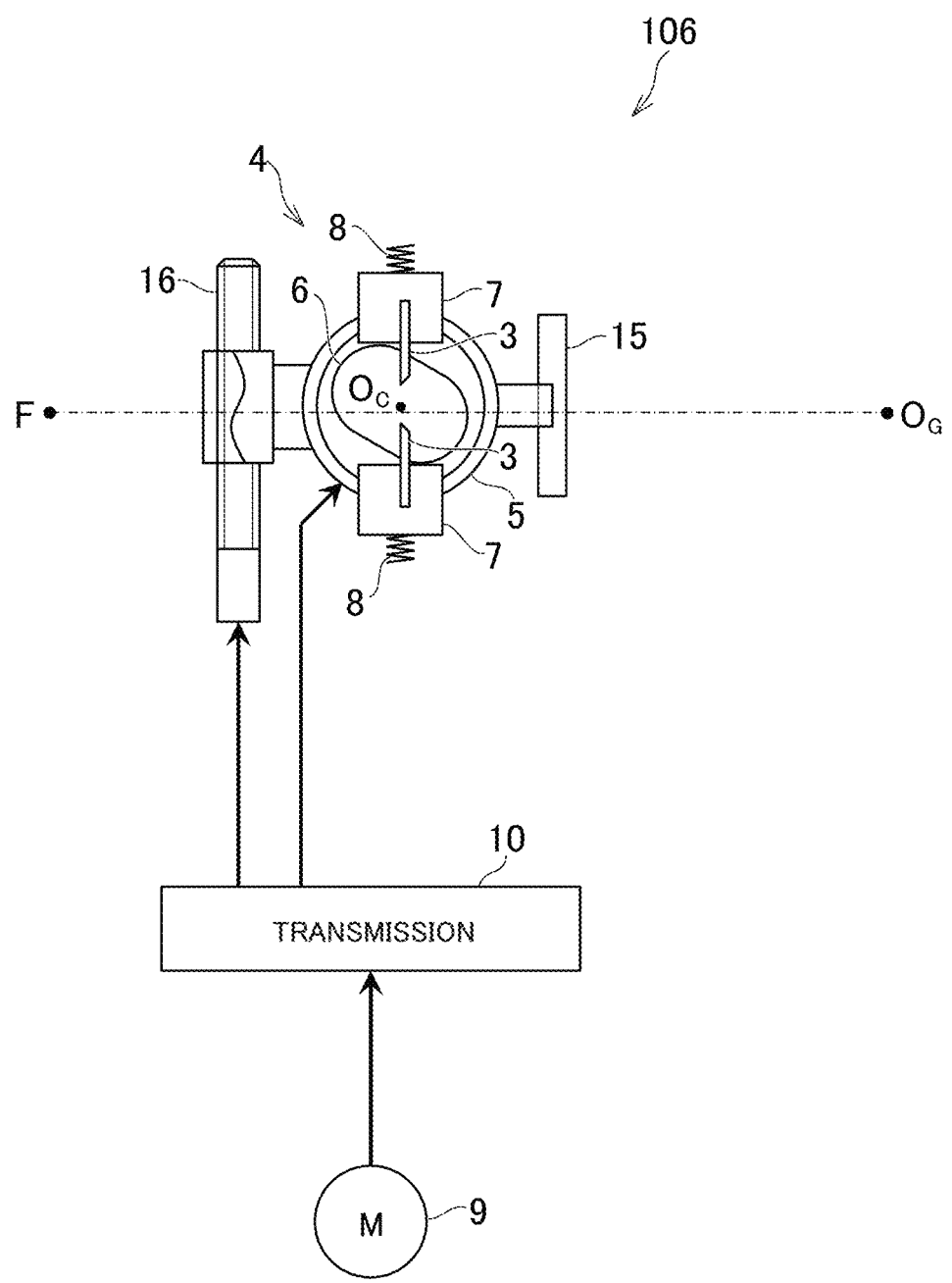
FIG. 10 is a diagram for illustrating an example of a mechanism of an asymmetric control unit in still another modification example of the at least one embodiment.

FIG. 10 is a diagram for illustrating an example of a mechanism of an asymmetric control unit 4 in still another modification example of the at least one embodiment. The asymmetric control unit 4 illustrated in FIG. 10 is different from the mechanism illustrated in FIG. 3 to FIG. 9B in that cam shapes for driving a shielding member 3 on one side and a shielding member 3 on the other side of a cam 6 are symmetrical. In other words, the shielding members 3 are opened/closed symmetrically with respect to a rotation center OC of a rotary shaft 5. Meanwhile, in this mechanism, the rotation center OC itself is moved in a direction perpendicular to a straight line F-OG connecting an X-ray source F and a rotation center $O_G$ of the goniometer depending on the rotation angle θ to control the shielding member 3 on the one side and the shielding member 3 on the other side asymmetrically with respect to the straight line F-OG.

To describe more specifically, in the asymmetric control unit 4 illustrated in FIG. 10, the rotary shaft 5, the cam 6, the cam followers 7, and the elastic members 8, and those components described above in the mechanism illustrated in FIG. 3 to FIG. 9B, are the same in terms of functions and configurations thereof, except for the cam shapes of the cam 6. As to the cam shapes of the cam 6, as described above, the cam shapes for driving the shielding member 3 on the one side and the shielding member 3 on the other side are symmetrical, and hence the pair of shielding members 3 are operated to be opened/closed symmetrically with respect to a position at which the divergence slit mechanism 106 is fully closed (and which in this example matches the rotation center OC).

Then, the entire cam mechanism including the rotary shaft 5 is supported to be movable in the direction perpendicular to the straight line F-OG. In the example of FIG. 10, the rotary shaft 5 is movably supported by a translation guide 15 and a screw mechanism 16. The translation guide 15 may be a so-called linear guide, and may be of any type. As an example, a commercially available optical single-axis stage may be used to fix the entire cam mechanism including the rotary shaft 5 on the stage. Further, the screw mechanism 16 is an example of a drive mechanism for precisely driving the entire cam mechanism including the rotary shaft 5 in the direction perpendicular to the straight line F-OG, in which a nut is moved in an axial direction in accordance with a rotation of a screw shaft by the rotational power input from the transmission 10. With the rotary shaft 5 being fixed to the nut, the entire cam mechanism including the rotary shaft 5 is moved along with the movement of the nut.

The rotational power from the electric motor 9 is input to the rotary shaft 5 and the screw mechanism 16, after being transmitted as required via the transmission 10. With such a mechanism, with the pair of shielding members 3 being opened/closed symmetrically from their fully-closed positions depending on the rotation angle θ of the goniometer, and with the position of the pair of shielding members 3 as a whole being moved at least in the direction perpendicular to the straight line F-OG, the shielding member 3 on the one side and the shielding member 3 on the other side are controlled asymmetrically with respect to the straight line F-OG.

The mechanism described above with reference to FIG. 10 is an example for achieving an asymmetric control unit 4 of the same type, and various modifications may be made thereto. Specifically, it is only required that the asymmetric control unit 4 include the mechanism for opening/closing the pair of shielding members 3 symmetrically from their fully-closed positions, and a mechanism for moving the position of the pair of shielding members 3 as a whole at least in the direction perpendicular to the straight line F-OG, and a specific configuration of each mechanism is not limited. For example, as the mechanism for opening/closing the pair of shielding members 3 symmetrically from their fully-closed positions, in addition to the cam mechanism illustrated in FIG. 10, a link mechanism or other mechanisms may be used, or even in a case in which a cam mechanism is used, the mechanism illustrated in FIG. 5A and FIG. 5B or other mechanisms may be used.

Further, as the mechanism for moving the position of the pair of shielding members 3 as a whole at least in the direction perpendicular to the straight line F-OG, in addition to the screw mechanism 16 illustrated in FIG. 10, a cam mechanism, a link mechanism, or other mechanisms may be used, or instead of inputting the rotational power from the electric motor 9 via the transmission 10, the position of the pair of shielding members as a whole may be controlled depending on the rotation angle θ with use of a dedicated electric motor. The position of the pair of shielding members 3 as a whole may be defined in this specification as a midpoint of a line segment connecting leading ends of the pair of plates 3 in the sheet surface of FIG. 10. Further, the meaning of the sentence: "this mechanism moves at least in the direction perpendicular to the straight line F-OG" means that the direction in which the position of the pair of shielding members 3 as a whole is moved by the mechanism at least has a component in the direction perpendicular to the straight line F-OG. Accordingly, the position of the pair of shielding members 3 as a whole may be moved in a diagonal direction with respect to the straight line F-OG, and the movement need not necessarily be linear.

Further, in the X-ray analysis apparatus 100 according to the at least one embodiment, the slit width of the divergence slit mechanism 106 can be controlled depending on a rotation angle that is α times the rotation angle of the goniometer 104 for a plurality of α's that are different from one another.

That is to say, when described in accordance with the at least one embodiment, the divergence slit mechanism 106 has slit width controlled by the asymmetric control unit 4 so that, with respect to the rotation angle θ of the rotating table 1 of the goniometer 104, the light flux of the X-ray radiated from the X-ray source F matches the width W of the sample 110 on the sample stage 2. As the exemplified specific configuration, the slit width of the divergence slit mechanism 106 is defined for each of the pair of shielding members 3 with respect to the rotation angle θ by the cam shapes of the cam 6 rotated by the rotary shaft 5, which is rotated in synchronization with the rotating table 1 at a constant speed.

This means that the asymmetric control unit 4 is intentionally operated to control the slit width of the divergence slit mechanism 106 with respect to αθ. In other words, this literally means that, although an actual rotation angle of the rotating table 1 of the goniometer 104 is the angle θ, the slit width of the divergence slit mechanism 106 is controlled as if the rotation angle of the rotating table 1 was αθ.

In the configuration of the at least one embodiment described above, it is only required that, with respect to the rotation angle θ of the rotating table 1 of the goniometer 104, the rotary shaft 5 of the asymmetric control unit 4 of the divergence slit mechanism 106 be rotated to an angle of αθ, which is α times the rotation angle θ. Specifically, such an operation may be achieved by respectively controlling the rotating table 1 and the rotary shaft 5 by electric motors individually provided, or by setting a speed reduction ratio of the rotational power input from the electric motor 9 to be different for the rotating table 1 and the rotary shaft 5 by the transmission 10 illustrated in FIG. 3.

When the transmission 10 is used, the above-mentioned operation may be achieved by replacing the transmission 10 itself depending on a ratio α between the rotation speeds of the rotating table 1 and the rotary shaft 5, or with provision of a mechanism for varying a transmission gear ratio to the transmission 10, a value may be selected from among a plurality of suitable α's that are set in advance and are different from one another, or the value of α may be changed continuously in a certain range.

As the mechanism with which the transmission 10 can select a value from among a plurality of suitable α's that are set in advance and are different from one another, a transmission of a so-called dog clutch type, which is also adopted in motorcycles, for example, may be suitably used. Further, as the mechanism with which the value of a can be changed continuously in the certain range, a so-called continuously variable transmission (CVT) mechanism, which is also adopted in four-wheeled vehicles, for example, may be suitably used.

The above-mentioned mechanism is adopted because, by controlling the slit width of the divergence slit mechanism 106 depending on a rotation angle that is α times the rotation angle of the goniometer 104, the irradiation width W0 of the X-ray can be changed artificially for a sample 110 having a different width. More specifically, when a sample 110 having a width of αW, which is α times the width W of the sample 110 originally assumed at the time of design (that is, target value of the irradiation width W0 of the X-ray when α=1) is mounted on the goniometer 104, by controlling the slit width of the divergence slit mechanism 106 depending on the rotation angle that is α times the rotation angle of the goniometer 104, the irradiation width of the X-ray can be matched with αW0 with high accuracy, and even in a region in which θ has a small value, the surface of the sample 110 can be irradiated with the X-ray without generating waste, to suppress the reduction in diffracted X-ray intensity, and prevent the increase in background noise caused by the outside of the sample 110 being irradiated with the X-ray.

Figure 11:
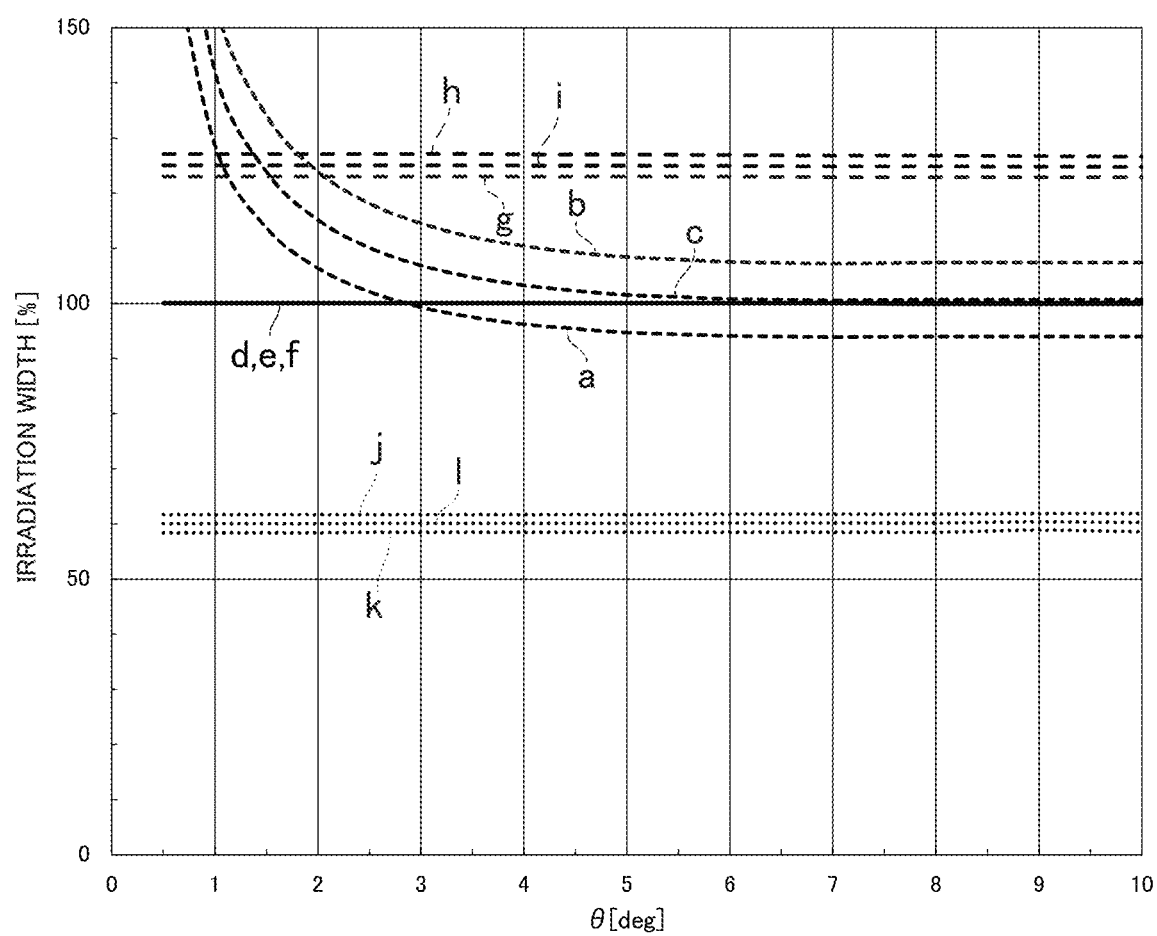
FIG. 11 is a graph for showing changes in irradiation width of the X-ray on a sample surface of the sample with respect to a rotation angle θ, which are obtained when a divergence slit mechanism including an asymmetric control unit capable of varying a ratio α of rotation speeds of a rotating table and a rotary shaft is used.

FIG. 11 is a graph for showing changes in irradiation width of the X-ray on the sample surface of the sample 110 with respect to the rotation angle θ, which are obtained when the divergence slit mechanism 106 including an asymmetric control unit 4 capable of varying the ratio α between the rotation speeds of the rotating table 1 and the rotary shaft 5 is used. The graph shows three cases in which α=1, α=1.25, and α=0.6. The display format of the graph is similar to that of FIG. 7.

The case in which α=1 indicates a case in which the width of the sample 110 is W, as originally designed, and although overlapping and appearing to be one line, changes in irradiation width W1 on the front side, irradiation width W2 on the back side, and entire irradiation width W0 are indicated by the solid lines "d", "e", and 'f', respectively. The solid lines "d", "e", and "f" are the same as those shown in FIG. 7, and all match a design target value with high accuracy. Further, for reference, changes in irradiation width W1 on the front side, irradiation width W2 on the back side, and entire irradiation width W0 in the comparative example that is the same as that shown in FIG. 7 are indicated by short broken lines "a", "b", and "c", respectively.

A case in which α=1.25 is a case in which the width of the sample 110 is 25% larger than the design value W, and changes in irradiation width W1 on the front side, irradiation width W2 on the back side, and entire irradiation width W0 are indicated by broken lines "g", "h", and "i", respectively. As can be discerned from the broken line "g", although the irradiation width W1 on the front side is slightly smaller than an actual width on the front side of the sample 110, and the irradiation width W2 on the back side is slightly larger than an actual width on the back side of the sample 110, the entire irradiation width W0 is substantially 125%, and matches an actual width of the sample 110 with high accuracy. Further, extents of deviation of the irradiation width W1 on the front side and the irradiation width W2 on the back side are at most about 1.7% of the width of the sample 110, and do not pose any practical problem.

A case in which α=0.6 is a case in which the width of the sample 110 is 40% smaller than the design value W, and changes in irradiation width W1 on the front side, irradiation width W2 on the back side, and entire irradiation width W0 are indicated by broken lines "j", "k", and "l", respectively. As can be discerned from the broken line "j", although the irradiation width W1 on the front side is slightly larger than an actual width on the front side of the sample 110, and the irradiation width W2 on the back side is slightly smaller than an actual width on the back side of the sample 110, the entire irradiation width W0 is substantially 60%, and matches an actual width of the sample 110 with high accuracy as with the case in which α=1.25. Further, extents of deviation of the irradiation width W1 on the front side and the irradiation width W2 on the back side are at most about 3% of the width of the sample 110, and it is assumed that the extents of deviation do not pose any practical problem.

Further, it can be seen that, irrespective of the value of a, all the irradiation widths take a substantially constant value with respect to the value of 0, and that the slit width of the divergence slit mechanism 106 can be controlled irrespective of the value of 0. With such control of the slit width of the divergence slit mechanism 106 depending on the rotation angle that is α times the rotation angle of the goniometer 104, samples 110 having different widths can be handled easily.

Figure 12A:
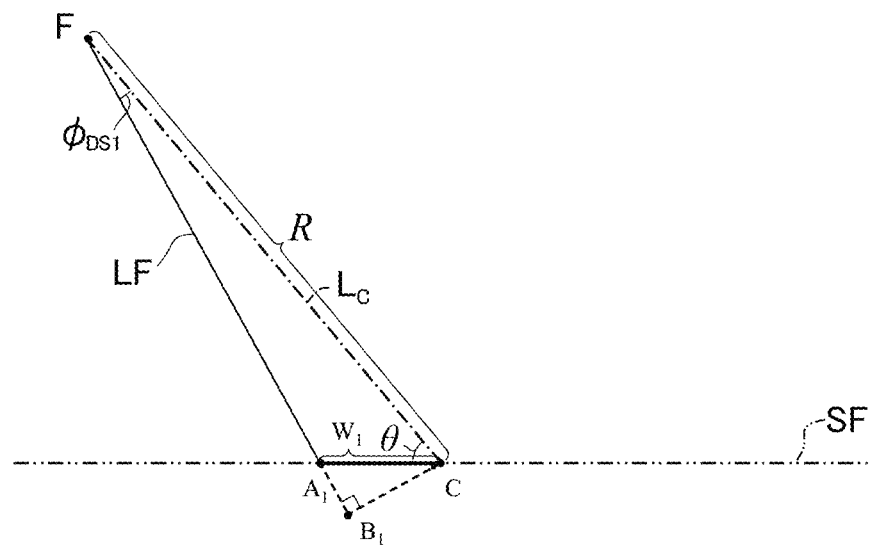
FIG. 12A is a view for illustrating a relationship between an irradiation width W1 on a front side of a center C, and the angle θ and a divergence angle φDS1.
Figure 12B:
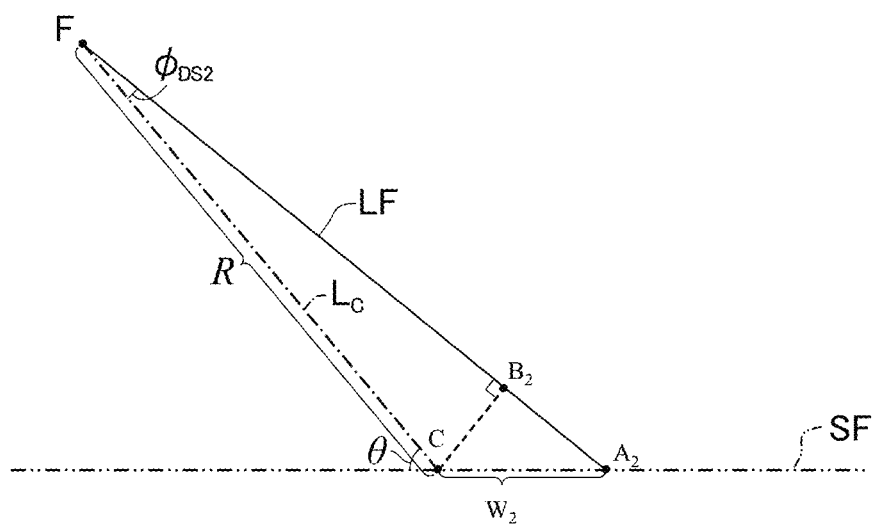
FIG. 12B is a view for illustrating a relationship between an irradiation width W2 on a back side of the center C, and the angle θ and a divergence angle φDS2.

The ability to handle the sample 110 as if the width of the sample 110 was αW, which is α times the design value W, with the control of the slit width of the divergence slit mechanism 106 depending on the rotation angle that is α times the rotation angle of the goniometer 104 is not dependent on a particular structure of the asymmetric control unit 4 described above, but generally holds. This is described below with reference to FIG. 12A and FIG. 12B. FIG. 12A and FIG. 12B are views for illustrating a geometrical relationship in an X-ray diffraction apparatus in accordance with FIG. 1, and hence a divergence slit mechanism is hereinafter denoted by a reference symbol DS in accordance with FIG. 1. It is assumed here that the slit width of the divergence slit mechanism DS is controlled with respect to αθ, which corresponds to α times the angle θ.

First, prior to the description, as is apparent from FIG. 1, "W0=W1+W2" is established, and as has already been described, the slit width of the divergence slit mechanism DS is controlled so that "W_0=W" is established when a divergence angle $\varphi_{DS}$ of the light flux LF is the angle θ.

Now, first in the irradiation width $W_0$, a relationship between the irradiation width $W_1$ on the front side of the center C and a divergence angle $\varphi_{DS1}$ on the front side of the angle θ and the center C is considered. At this time, as illustrated in FIG. 12A, an intersection of an edge of the light flux LF on the front side of the center C and a sample surface SF is represented by $A_1$, and a foot of a perpendicular extended from the center C to a straight line $FA_1$ is represented by $B_1$. Further, a length between the X-ray source F and the center C is represented by R. At this time, $$\overline{B_1C} = R \sin \varphi_{DS1} = W_1 \sin(\theta + \varphi_{DS1})$$

is established, and hence $$W_1 = \frac{R \sin \phi_{DS1}}{\sin(\theta + \phi_{DS1})}$$

is obtained.

Similarly, a relationship between the irradiation width W2 on the back side of the center C and a divergence angle $\varphi_{DS2}$ on the back side of the angle θ and the center C is considered, and as illustrated in FIG. 12B, an intersection of an edge of the light flux LF on the back side of the center C and the sample surface SF is represented by $A_2$, and a foot of a perpendicular extended from the center C to a straight line $FA_2$ is represented by $B_2$. At this time, $$\overline{B_2C} = R \sin \varphi_{DS2} = W_2 \sin(\theta - \varphi_{DS2})$$

is established, and hence $$W_2 = \frac{R\sin\phi_{DS2}}{\sin(\theta + \phi_{DS2})}$$

is obtained.

Here, considering reciprocals of $W_1$ and $W_2$, the equations $$W_1^{-1} = \frac{\sin(\theta + \phi_{DS1})}{R\sin\phi_{DS1}}$$

$$W_2^{-1} = \frac{\sin(\theta - \phi_{DS2})}{R\sin\phi_{DS2}}$$

are established. Further, when the numerators of the above-mentioned equations are developed, with $\theta \gg \varphi_{DS1}$ and $\theta \gg \varphi_{DS2}$, and with $\varphi_{DS1}$ and $\varphi_{DS2}$ being nearly equal to 0, it can be regarded that $\sin \varphi_{DS1}$ and $\sin \varphi_{DS2}$ are nearly equal to 0, and that $\cos \varphi_{DS1}$ and $\cos \varphi_{DS2}$ are nearly equal to 1, and hence the following approximations can be made:

$$W_1^{-1} = \frac{\sin\theta\cos\phi_{DS1} + \cos\theta\sin\phi_{DS1}}{R\sin\phi_{DS1}} \cong \frac{\sin\theta}{R\sin\phi_{DS1}}$$

$$W_2^{-1} = \frac{\sin\theta\cos\phi_{DS2} + \cos\theta\sin\phi_{DS2}}{R\sin\phi_{DS2}} \cong \frac{\sin\theta}{R\sin\phi_{DS2}}$$

Then, in the X-ray diffraction apparatus, it is assumed that $\theta \ll 1$ (in a circular measure. When notated in a degree measure, generally considering a range of $\theta \leq 10°$ is practically sufficient. In a range of $\theta > 10°$, the slit width of the divergence slit mechanism DS reaches a maximum width, and no consideration is required because it is assumed that further control is not required). Thus, it can be approximated that $\sin \theta \approx \theta$, and when $\varphi_{DS1}$ and $\varphi_{DS2}$ are assumed to be fixed values, the following approximations can be made using constants $C_1$ and $C_2$:
provided that:

$$W_1^{-1} \cong \frac{\theta}{C_1}$$

$$W_2^{-1} \cong \frac{\theta}{C_2}$$

then, $C_1 = \frac{1}{R\sin\phi_{DS1}}, C_2 = \frac{1}{R\sin\phi_{DS2}}$

With use of the above-mentioned results, it is found that the irradiation width $W_0$ can be approximately expressed as a function of $\theta$ as follows:

$$W_0(\theta) = W_1 + W_2 \cong \frac{C_1 + C_2}{\theta}$$

From this relationship, when an angle of $\theta/\alpha$ that is $1/\alpha$ times the angle $\theta$ is considered, $$W_0\left(\frac{\theta}{\alpha}\right) \cong \alpha \frac{C_1 + C_2}{\theta} = \alpha W_0(\theta)$$

is derived, and this means that the irradiation width is approximated by $\alpha W_0$, which is $\alpha$ times the irradiation width $W_0$.

This means that, in terms of the relationship between the angle $\theta$ and the divergence angles $\varphi_{DS1}$ and $\varphi_{DS2}$, when the angle $\theta$ is multiplied by $1/\alpha$, and when the divergence angles $\varphi_{DS1}$ and $\varphi_{DS2}$ are maintained at values defined for the original angle $\theta$, the irradiation width is $\alpha W_0$, which is $\alpha$ times the irradiation width $W_0$. This can be stated by reversing the relationship between the angle $\theta$ and the divergence angles $\varphi_{DS1}$ and $\varphi_{DS2}$ as follows: when the divergence angles $\varphi_{DS1}$ and $\varphi_{DS2}$ are set to values defined for the angle of $\alpha\theta$ with respect to the angle $\theta$, the irradiation width is $\alpha W_0$, which is $\alpha$ times the irradiation width $W_0$.

From the above consideration, in a range in which it is assumed that $\theta$, $\varphi_{DS1}$, and $\varphi_{DS2}$ are much less than 1, by generally defining the divergence angles $\varphi_{DS1}$ and $\varphi_{DS2}$ for the angle of $\alpha\theta$, which is $\alpha$ times the angle $\theta$, the irradiation width can be controlled to $\alpha W_0$, which is $\alpha$ times the irradiation width $W_0$, with practically sufficient accuracy.

In the above description, as the opening/closing mechanism, which is controlled asymmetrically for the shielding member 3 on the one side and the shielding member 3 on the other side of the straight line connecting the X-ray source F and the rotation center $O_G$ of the goniometer 104 depending on the rotation angle of the goniometer 104 by the asymmetric control unit 4, the divergence slit mechanism 106 provided between the X-ray source F and the sample 110 has been exemplified, but an opening/closing mechanism to which a similar asymmetric control unit 4 is provided is not necessarily limited to the divergence slit mechanism 106. Although not described in the present application, as an example, an asymmetric control unit 4 may be provided to a scattering slit mechanism, which is an opening/closing mechanism provided between the sample 110 and the X-ray detector 107. In that case, as with the divergence slit mechanism 106 that has already been described, the scattering slit mechanism includes a pair of shielding members, and is controlled asymmetrically for a shielding member on one side and a shielding member on the other side of a straight line connecting the X-ray detector 107 and the rotation center $O_G$ of the goniometer 104 depending on the rotation angle of the goniometer 104.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An X-ray analysis apparatus, comprising:
   a rotary shaft;
   a cam fixed to the rotary shaft and rotating about a rotation center of the rotary shaft;
   cam followers which move a peripheral shape of the cam;
   a pair of shielding members fixed to the cam followers;
   a goniometer;
   a sample stage provided at a rotation center of the goniometer;

an X-ray source configured to irradiate a sample with an X-ray, the sample being fixed on the sample stage;

an X-ray detector configured to detect the X-ray diffracted by the sample; and an opening/closing mechanism configured to vary a width of a slit, which is formed between the pair of shielding members and allows the X-ray to pass therethrough, by opening/closing the pair of shielding members, the opening/closing mechanism including an asymmetric control unit configured to control aperture widths of the pair of shielding members asymmetrically for one of the pair of shielding members on one side of a straight line connecting the X-ray source and the rotation center of the rotary shaft, and another one of the pair of shielding members on another side of the straight line depending on a rotation angle of the goniometer.

2. The X-ray analysis apparatus according to claim 1, wherein the opening/closing mechanism is a divergence slit mechanism configured to limit the X-ray radiated from the X-ray source.

3. The X-ray analysis apparatus according to claim 1, wherein in the cam, a cam shape for driving the one of the pair of shielding members on the one side and a cam shape for driving the other one of the pair of shielding members on the other side are different from each other.

4. The X-ray analysis apparatus according to claim 3, wherein the cam has a cylindrical surface for setting the slit to a certain width when the rotation angle of the goniometer is a rotation angle at which an angle of the X-ray, with which the sample stage is irradiated by the X-ray source, is at and around 0°.

5. The X-ray analysis apparatus according to claim 4, wherein the cam has notch surfaces for keeping the width of the slit constant when the goniometer is rotated in a direction in which the angle of the X-ray, with which the sample stage is irradiated by the X-ray source, is negative.

6. The X-ray analysis apparatus according to claim 1, wherein the asymmetric control unit includes a mechanism for opening/closing the pair of shielding members symmetrically from fully-closed positions thereof depending on the rotation angle of the goniometer, and a mechanism for moving a position of the pair of shielding members as a whole at least in a direction perpendicular to the straight line connecting the one of the X-ray source and the X-ray detector, and the rotation center.

7. The X-ray analysis apparatus according to claim 1, wherein the asymmetric control unit is configured to control the width of the slit depending on a rotation angle that is a times the rotation angle of the goniometer for a plurality of a's that are different from one another.

8. The X-ray analysis apparatus according to claim 3, wherein the asymmetric control unit includes a transmission configured to rotate the cam at a rotation speed depending on a rotation angle that is a times the rotation angle of the goniometer for a plurality of a's that are different from one another.

9. An X-ray analysis apparatus, comprising:

a goniometer;

a sample stage provided at a rotation center of the goniometer;

an X-ray source configured to irradiate a sample with an X-ray, the sample being fixed on the sample stage;

an X-ray detector configured to detect the X-ray diffracted by the sample; and an opening/closing mechanism configured to vary a width of a slit, which is formed between a pair of shielding members and allows the X-ray to pass therethrough, by opening/closing the pair of shielding members, the opening/closing mechanism including an asymmetric control unit configured to control aperture widths of the pair of shielding members asymmetrically for one of the pair of shielding members on one side of a straight line connecting one of the X-ray source and the X-ray detector, and the rotation center, and another one of the pair of shielding members on another side of the straight line depending on a rotation angle of the goniometer, wherein the asymmetric control unit includes a cam, which is fixed to a rotary shaft and is configured to rotate in conjunction with rotation of the goniometer to control the width of the slit, and in which a cam shape for driving the one of the pair of shielding members on the one side and a cam shape for driving the other one of the pair of shielding members on the other side are different from each other with reference to a straight line connecting the X-ray source and a rotation center of the rotary shaft.

* * * * *